Figure 1:
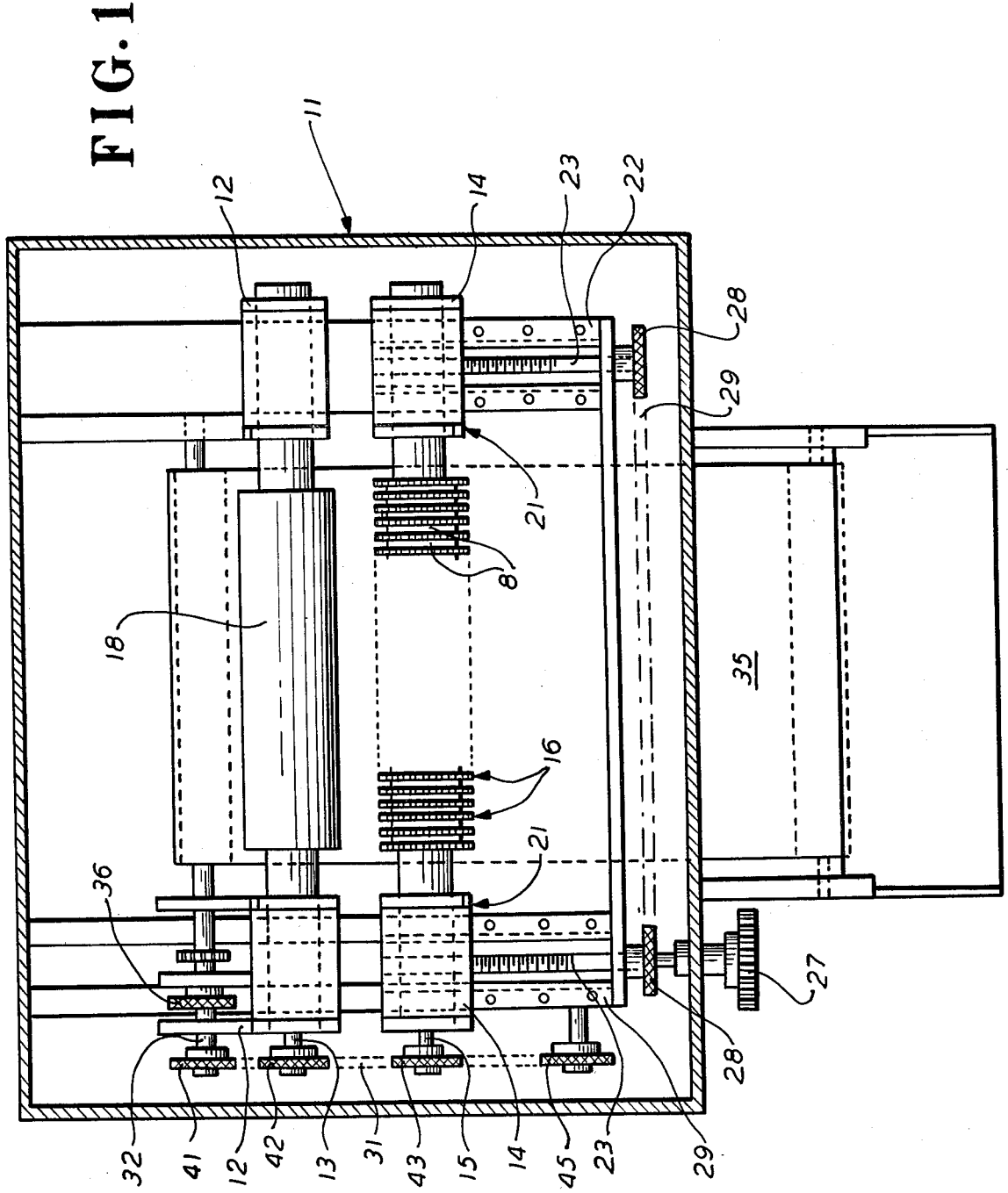

United States Patent [19]

Lobiondo et al.

[11] 4,453,288

[45] Jun. 12, 1984

[54] JAM RESISTANT APPARATUS FOR MACERATING MEAT

[76] Inventors: Salvatore J. Lobiondo, 12 Decamp Ct., West Caldwell, N.J. 07006; Joseph V. Lobiondo, 79 Winding Rd., Bloomfield, N.J. 07003

[21] Appl. No.: 352,308

[22] Filed: Feb. 25, 1982

Related U.S. Application Data

[63] Continuation of Ser. No. 105,098, Dec. 19, 1979, abandoned.

[51] Int. Cl.³ ............................................... A22C 9/00
[52] U.S. Cl. ...................................................... 17/26
[58] Field of Search .................................... 17/26, 27

[56] References Cited

U.S. PATENT DOCUMENTS

| | | | |
|---|---|---|---|
| 653,222 | 7/1900 | Fowler | 17/26 |
| 1,986,075 | 1/1935 | Spang | 17/26 |
| 2,516,621 | 7/1950 | Deckert | 17/26 |
| 3,893,384 | 7/1975 | Lobiondo et al. | 17/27 UX |
| 3,962,751 | 6/1976 | Wagner | 17/26 |

Primary Examiner—Willie G. Abercrombie
Attorney, Agent, or Firm—Flehr, Hohbach, Test, Albritton & Herbert

[57] ABSTRACT

An apparatus for macerating meat in which a plurality of slotted discs, spaced apart by crushing rings and mounted for rotation on a shaft are disposed in opposition to a generally circular roller having a smooth surface whereby portions of meat introduced between the slotted discs and crushing rings and the smooth roller are carried between the opposed members, macerated and do not jam between them.

3 Claims, 2 Drawing Figures

JAM RESISTANT APPARATUS FOR MACERATING MEAT

This is a continuation of application Ser. No. 105,098 filed Dec. 19, 1979, now abandoned.

RELATED APPLICATION

This application is a variant form of our application Ser. No. 44,755 filed June 1, 1979 which on June 2, 1981 issued as U.S. Pat. No. 4,270,244.

BACKGROUND OF THE INVENTION

1. Field of Invention

This invention relates generally to macerating meat and particularly to an apparatus for macerating meat in which the meat is ruptured and slitted by rotating discs and particularly to an apparatus in which the discs are disposed in spaced relationship to a smooth surface generally circular roller wherein protein introduced between the rotating smooth surface roller and the rotating blades resist jamming.

2. Prior Art

Numerous devices are available for macerating protein of various kinds, whether of fowl or animal derivation. They usually involve pairs of opposing blades rotating in spaced relation to each other in such a manner that the distance between them is less than the thickness of the protein. The rotating cutters dig deeply into the protein making the innermost portions readily accessible to curing agents which are calculated to have a stabilizing effect upon the protein. The more thorough the penetration, the better the preservative or stabilizing effect. Present macerating machines are now primarily concerned with maceration in depth to enable the curing agents to penetrate deeply into the fibrous tissue by rupturing it. Without such curing agents introduced into the protein, the protein may soon deteriorate and become unusable and unpalatable.

In view of the fact that these devices use offset opposing macerating blades or knives, both aspects, anterior and posterior, of the protein are macerated and with a high degree of thoroughness. Little regard is had to the fact that surface of some proteins when macerated presents a rough irregular broken and unappetizing appearance which is entirely uncharacteristic of the unmacerated protein.

Yet it is common practice to put these materials through the normal macerating device which may impart to a previously smooth and appetizing surface a torn, ruptured or broken appearance which is uncharacteristic of the unprocessed protein.

It is not possible to restore the suface of macerated materials to their former smooth natural appetizing aspect so that the cured products do not have as great a purchaser appeal as the uncured product.

In meat macerators which have a single shaft of macerating blades arranged in spaced relationship to a pressure plate, it has been found that larger pieces of protein often resist compression between the blades and the pressure plate and jam the mouth of the macerator until they are urged through by a plunger; it would be dangerous, of course, to exert manual pressure upon such a jammed piece of protein.

Operators of such apparatus frequently wear gloves and it is particularly dangerous for a gloved hand to attempt to urge a jammed piece of protein through the macerating apparatus because the rotating knives will seize upon and snag the gloves tending to pull the hand of the wearer into the machine.

SUMMARY OF THE INVENTION

It has been found that an apparatus can be devised which is resistent to jamming wherein instead of the protein or chunks of meat being macerated between rotating blades and a stationary meat table, there is provided rotating blades but in opposition thereto, there is a rotating roller which, although smooth, tends to urge the chunk of protein through the macerater rather than permitting it to jam against a stationary meat chute. In this particular apparatus, it is suitable to macerate meat which only requires one macerated surface rather than opposite macerated surfaces. The macerating elements include meat crushing rings and radially slotted macerating discs which penetrate deeply into the meat and the apparatus is highly resistent to jamming because the rotating smooth roller tends to urge the protein through the macerater rather than causing occasional jamming action as is the case with a stationary meat chute.

THE DRAWINGS

Figure 2:
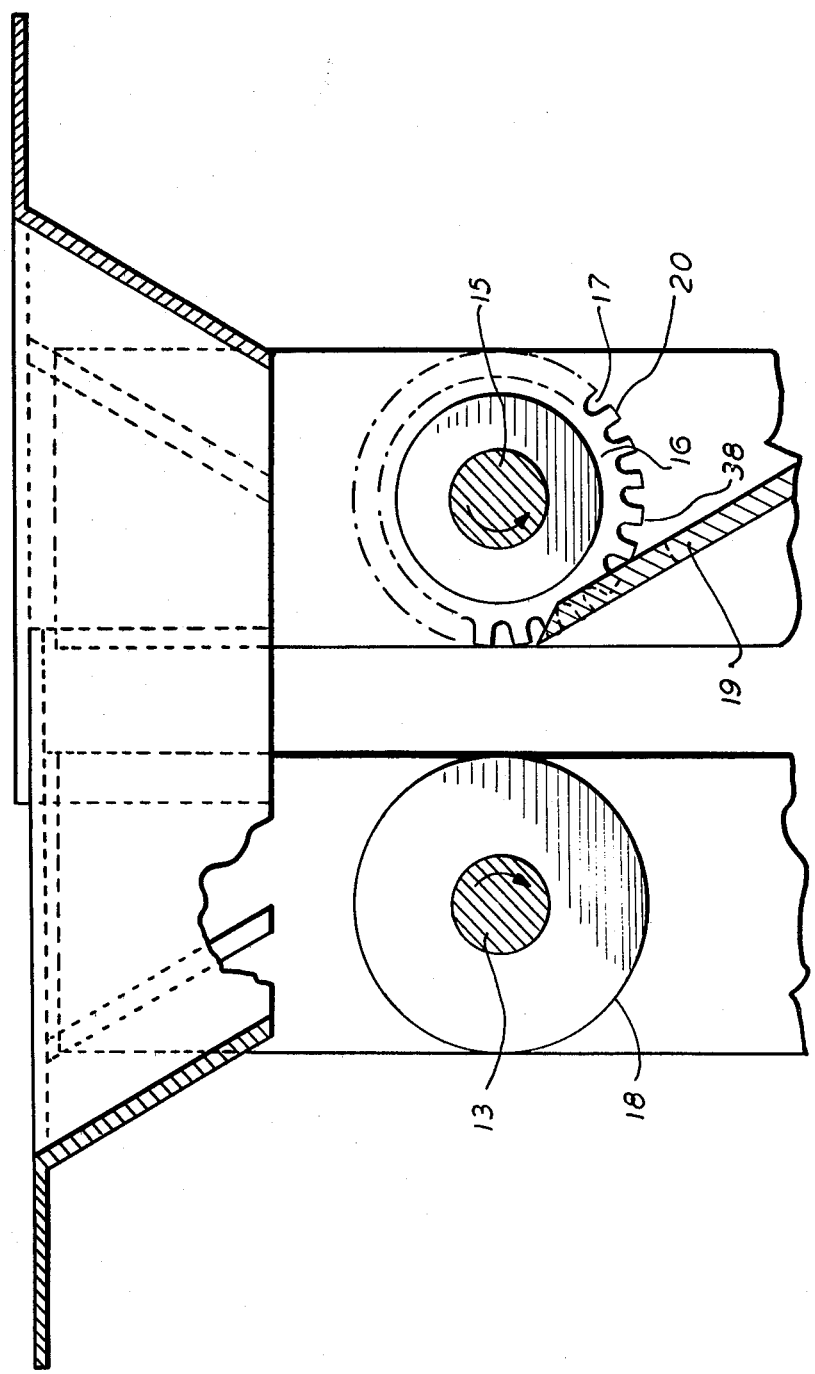

These objects and advantages as well as other objects and advantages may be attained by the device shown by way of illustration in the drawings in which:

FIG. 1 is top plan view of the macerater.
FIG. 2 is a side plan view thereof.

PREFERRED EMBODIMENT

The macerater provides a frame 11 which is generally rectangular in form and has a pair of bearings 12, 12 at the top on which is mounted a first shaft 13. A second pair of bearings 14, 14 are also located on the top of the frame and serve to rotatably mount a second shaft 15. The second shaft 15 carries a plurality of discs 16 which are rigidly secured thereto. The discs 16 are provided with radial slots 17 which extend from the periphery 38 of the discs 16 radially toward the center of the discs 16. The slots 17 may be approximately one inch deep. The first shaft 13 carries a smooth elongated roller 18.

The discs 16 on the second shaft 15 are disposed in general parallelism with each other in a generally vertical plane. Crusher rings 8 are mounted on the second shaft 15 between the discs 16. These rings 8 each have a central orifice to correspond with the diameter of the shaft 15 and they extend radially a distance so that their periphery is generally at the deepest point of the slots 17.

A comb 19 is secured below the shaft 15 with the teeth 20 intruded between the adjacent discs 16 on the shaft 15, whereby meat which has been crushed and slit is stripped out from between the adjacent discs 16.

The first shaft 13 is in a fixed position on the bearings 12, 12 and does not move from that position as it rotates. The second shaft 15 however is a movable shaft for the bearings 14, 14 are carried by mountings 21, 21 which are slidable in tracks 22. Threaded shafts 23, 23 are mounted for rotation on the frame 11 and engage correspondingly threaded passages in the mountings 21, 21, whereby the rotation of the threaded shafts 23, 23 causes the advancing of the second shaft 15 toward the first shaft 13. Reverse rotation of the threaded shafts 23, 23 causes the second shaft 15 is to be drawn away from the first shaft 13. This is accomplished by a knob 27 mounted on one of the shafts 23. Each of the threaded shafts 23, 23 carries a sprocket 28 and a chain 29 is engaged with the sprockets 28, 28 whereby both threaded shafts simultaneously rotate to move the second shaft constantly in general parallelism with the stationary first shaft 13. The tracks 22 are limited in their extent so that the discs 16 on the second shaft 15 can only move their peripheral edges toward the smooth roller 18 but not into contact with it. In this manner, the gap between the discs 16 and the smooth roller 18 may be widened or narrowed to accommodate various sized pieces of meat between the roller 18 and the discs 16. A motor (not shown) drives a chain 31 that passes over a sprocket 41, under a sprocket 42 on the first shaft 13. The chain then proceeds to engage a sprocket 43 on the second shaft 15 over which it passes. This sprocket 43 is on the slidable mounting 21 and has immediately beneath it, another sprocket (not shown) around which the chain 41 passes to the sprocket 45 whence the chain 31 returns to the motor. The movable mounting 21 accomplishes the engagement of the chain with all of the sprockets despite the movement of the second movable shaft 15 toward or away from the first stationary shaft 13. Thus the operation of a macerater can be accomplished by adjusting the distance of the second shaft 15 from the first shaft 13 to accommodate between them pieces of meat of varying dimension. If desired, the sprockets 42, 43 may be provided with different amounts of teeth and this will rotate the shafts 13, 15 at different speeds thereby varying the degree of maceration. A conveyor 35 is mounted on the frame 11 below the shafts 13 and 15 and is driven by a chain 36 driven by the drive shaft 32.

What is claimed is:

1. A jam resistant macerator for macerating meat along one selected surface while preserving the appearance of the other surfaces, comprising: a frame; a first shaft rotatably mounted upon said frame; a roller having a generally smooth continuous surface arranged on said shaft; a second shaft rotatably mounted on said frame; a plurality of macerating discs and meat crushing rings arranged on said second shaft, the peripheries of the discs being disposed in spaced relation to said smooth surface, said macerating discs having radial slots in their periphery presenting radial and peripheral edges for macerating the meat, said crusher rings being mounted between macerating discs for simultaneously crushing the meat between said rings and said surface of said smooth roller thereby facilitating vigorous maceration over the selected surface of the meat to be macerated, said crushing rings extending radially to a distance such that their periphery is at the deepest point of said slots in the macerating discs, said crushing rings acting with said smooth roller to urge the meat through the macerator while avoiding occasional jamming action; means for driving said first and second shafts in counter-rotation so that meat sections entering the space between said smooth surface and said plurality of discs and rings will be urged by the smooth roller into moving contact with said macerating discs and crushing rings so as to be pulled therethrough; and comb means arranged to project into the spaces between adjacent discs for stripping the meat away from said discs.

2. A jam resistant macerator according to claim 1, comprising means on said frame for receiving ends of one of said first and second shafts, means for shifting selectively said receiving means so as to permit adjustment of the space between the periphery of said discs and said crushing rings on said second shaft and the smooth surface of said roller on said first shaft.

3. A method for macerating meat by deeply penetrating into one surface of the meat while preserving the other surfaces from maceration, comprising the steps of passing meat between a smooth roller mounted on a first rotating shaft and a plurality of radially slotted macerating discs and interspaced crushing rings mounted on a second contra-rotating shaft, said crushing rings having a radial dimension such that their peripheries are at the deepest point of the radial slots in said macerating discs, crushing the meat by engagement between the crushing rings and the smooth roller as the meat passes between contra-rotating shafts; simultaneously tearing one surface of the crushed meat by engagement with peripheral edges of the slotted discs as the meat passes between said shafts while the opposite surface of the meat is engaging the smooth roller; and stripping the meat from between said slotted discs as the meat is passed out from between said shafts.

* * * * *